(12) United States Patent
Horsman et al.

(10) Patent No.: US 10,915,368 B2
(45) Date of Patent: *Feb. 9, 2021

(54) DATA PROCESSING

(71) Applicant: INTERNATIONAL BUSINESS MACHINES CORPORATION, Armonk, NY (US)

(72) Inventors: Steven J. Horsman, Hampshire (GB); Samuel J. Smith, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/397,079

(22) Filed: Apr. 29, 2019

(65) Prior Publication Data

US 2019/0250952 A1 Aug. 15, 2019

Related U.S. Application Data

(63) Continuation of application No. 15/370,299, filed on Dec. 6, 2016, now Pat. No. 10,387,207.

(51) Int. Cl.
*G06F 9/46* (2006.01)
*G06F 9/50* (2006.01)
*G06F 9/48* (2006.01)

(52) U.S. Cl.
CPC .......... *G06F 9/5066* (2013.01); *G06F 9/4881* (2013.01); *G06F 9/505* (2013.01)

(58) Field of Classification Search
USPC ....................................................... 718/104
See application file for complete search history.

(56) References Cited

U.S. PATENT DOCUMENTS 7,631,310 B1 * 12/2009 Henzinger .............. G06F 9/505
707/999.007
8,782,641 B2 7/2014 Cotner et al.
(Continued)

FOREIGN PATENT DOCUMENTS

WO WO 2013021223 A1 2/2013

OTHER PUBLICATIONS

Prasad, M S et al., "Improving the Performance of Processing for Small Files in Hadoop: A Case Study of Weather Data Analytics", International Journal of Computer Science and Information Technologies, vol. 5, No. 5 (2014) (pp. 6436-6439).

(Continued)

*Primary Examiner* — Mehran Kamran
(74) *Attorney, Agent, or Firm* — William A. Kinnaman, Jr., Esq.; Kevin P. Radigan, Esq.; Heslin Rothenberg Farley & Mesiti P.C.

(57) ABSTRACT

Methods are provided for data processing in a multi-threaded processing arrangement. The methods include receiving a data processing task to be executed on data including a plurality of data records, the data having an associated record description including information relating to parameters or attributes of the plurality of data records. Based on the received data processing task, the record description is analyzed to determine an indication of expected workload for the data records. Further, the data is divided into a plurality of data sets. Based on the determined indication of expected workload for the data records, the data sets are allocated processing threads for parallel processing by a multi-threaded processing arrangement.

18 Claims, 5 Drawing Sheets

(56) References Cited

U.S. PATENT DOCUMENTS

| | | | | |
|---|---|---|---|---|
| 2002/0073129 A1* | 6/2002 | Wang | ............... | G06F 9/4881 718/102 |
| 2004/0088380 A1* | 5/2004 | Chung | ............ | H04N 21/23116 709/219 |
| 2004/0210948 A1* | 10/2004 | Jin | ............... | H04N 21/2312 725/145 |
| 2008/0195842 A1* | 8/2008 | Izawa | ............... | G06F 15/7867 712/11 |
| 2009/0106260 A1* | 4/2009 | Eshwar | ............ | H04L 67/1008 |
| 2010/0005472 A1* | 1/2010 | Krishnaraj | ......... | G06F 9/5044 718/104 |
| 2010/0095303 A1 | 4/2010 | Archer et al. | | |
| 2010/0235845 A1* | 9/2010 | Bates | ............... | G06F 9/5044 718/105 |
| 2010/0251257 A1* | 9/2010 | Kim | ............... | G06F 9/5066 718/105 |
| 2011/0072058 A1* | 3/2011 | Tang | ............... | G06F 9/5055 707/823 |
| 2011/0078691 A1* | 3/2011 | Yildiz | ............... | G06F 9/4812 718/103 |
| 2011/0321058 A1* | 12/2011 | Schmidt | ........... | G06F 9/505 718/105 |
| 2012/0303720 A1* | 11/2012 | Rajasekar | ........... | G06F 9/5027 709/206 |
| 2013/0047155 A1* | 2/2013 | Caspole | ........... | G06F 9/445 718/1 |
| 2013/0167187 A1* | 6/2013 | Pieper | ............... | H04N 19/436 725/116 |
| 2013/0212152 A1* | 8/2013 | Kuruvilla | ........... | H04L 67/06 709/203 |
| 2014/0059310 A1* | 2/2014 | Du | ............... | G06F 11/2094 711/162 |
| 2014/0109102 A1* | 4/2014 | Duncan | ............ | G06F 9/4881 718/103 |
| 2014/0215477 A1* | 7/2014 | Chen | ............... | G06F 9/5066 718/102 |
| 2014/0245310 A1* | 8/2014 | Claes | ............... | G06F 9/4843 718/102 |
| 2015/0254105 A1* | 9/2015 | Nishimura | ........... | G06F 9/4881 718/103 |
| 2016/0291821 A1* | 10/2016 | Feiges | ............... | G06F 9/4881 |
| 2017/0171246 A1* | 6/2017 | Arumugam | ........... | H04L 63/101 |
| 2017/0177616 A1* | 6/2017 | Ying | ............... | G06F 16/11 |
| 2017/0249215 A1* | 8/2017 | Gandhi | ............ | G06F 11/1425 |
| 2017/0322948 A1* | 11/2017 | Chen | ............... | G06F 16/152 |
| 2018/0157529 A1 | 6/2018 | Horsman et al. | | |
| 2018/0157530 A1 | 6/2018 | Horsman et al. | | |

OTHER PUBLICATIONS

Horsman et al., "Data Processing", U.S. Appl. No. 16/397,094, filed Apr. 29, 2019 (36 pages).

Horsman et al., "List of IBM Patents and/or Patent Applications Treated as Related", U.S. Appl. No. 16/397,079, filed Apr. 29, 2019, dated Apr. 29, 2019 (2 pages).

\* cited by examiner

DATA PROCESSING

BACKGROUND

The present invention relates to the field of data processing, and more particularly to a method, computer program product and system for data processing in a multi-threaded processing arrangement.

Today, data processing arrangements (software and/or hardware) typically have an inherent requirement to process large volumes of data from a variety of different sources. By way of example, a file or database may contain many TeraBytes (TB) of data, not all of which may be relevant to any certain data processing task.

Multi-threaded processing arrangements have been proposed which enable parallel processing to be implemented. Processing data in parallel (e.g. using multiple processing threads) may enable a reduction in the time required to perform a data processing task by distributing the workload associated with the task across processing engines.

However, there remains the problem of how to distribute processing workload across several separate threads/processes. For example, an approach which enables the processing workload to be distributed evenly may be desired, but such a distribution may not be optimal in terms of performance for example. Also, there may exist a conflict between the need to decrease overhead associated with processing workload decomposition and distribution across multiple processing engines, versus the desire to increase potential parallelism for improved load balancing and utilization of the processing engines

SUMMARY

The present invention provides a method for data processing that can distribute processing workload across several separate processing threads of a multi-threaded processing environment so as to provide improved processing performance (e.g. faster processing task completion).

The present invention further provides a computer program product including computer program code for implementing the method when executed on a processor of a data processing system.

The present invention yet further provides a data processing system adapted to execute this computer program code.

According to an embodiment of the present invention there is provided a computer-implemented method for data processing in a multi-threaded processing arrangement. The method includes: receiving a data processing task to be executed on data including a plurality of data records, the data having an associated record description including information relating to parameters or attributes of the plurality of data records; based on the received data processing task, analyzing the record description to determine an indication of expected workload for the data records; dividing the data into a plurality of data sets; and based on the determined indication of expected workload for the data records, allocating the data sets to processing threads for parallel processing by the multi-threaded processing arrangement.

In one or more aspects, processes are provided for analyzing data in view of a requested or planned processing task to assess how properties of the data may impact execution of the processing task. By evaluation of data properties, the data may be spilt into portions (e.g. virtual segments of the data may be defined using address ranges) and the portions then allocated to separate processing threads. For example, evaluation of one or more descriptions of records in the data may identify whether certain records and/or portions of the data require additional or reduced processing resource. This may enable portions of the data to be defined and allocated to processing threads so as improve execution of the processing task (e.g. by reducing the amount of time it takes to complete execution of the task). Proposed embodiments may therefore minimize processing requirements by allocating processing workload in a more efficient manner. In particular, it may help to avoid processing thread redundancy and/or help to speed up task completion by allocating processing threads in an effective and efficient manner.

By way of demonstrating a potential benefit, when a processing task requires a processing operation to be executed on a large data file, processing disclosed herein may undertake an analysis of the data file and identify how portions or subsets of the data should be defined and allocated to various processing threads for improved processing efficiency. Thus, in such circumstances, certain segments of a data file may be defined and allocated to individual processing threads/engines to ensure appropriate or adequate processing resource is allocated to particular portions or subsets of the data. This may help to ensure efficient and effective use of available processing resources.

In one or more implementations, processing provided herein may employ analysis of data that is to be processed so as to determine the most appropriate way to allocate the portions of the data to different processing threads. For instance, where it is identified that a first portion of a data file includes data that will require more processing resource than a second portion of the data file, the data file may be (virtually) divided (e.g. split or separated) into the first and second portions and the first portion then allocated to superior (e.g. faster or more powerful) processing resource than the second portion. In this way, properties or characteristics of the data may be identified and/or analyzed (e.g. prior to undertaking a processing task) and then used to determine how best to allocate (e.g. distribute or apportion) the data for parallel processing across various processing threads.

Some provided aspects may thus employ pre-processing of data to identify how to split the data so as to distribute processing workload across several separate processing threads Many different ways to allocate data sets to different processing threads for parallel processing may be employed by one or more embodiments, and these may be implemented in isolation or in combination. Also, many different parameters or attributes of the data may be used to determine an indication of expected workload for the data, and these may be implemented in isolation or in combination.

In an embodiment, the record description may include metadata. Embodiments may therefore make use of existing information associated with data, thus avoiding the need to generate a special or proprietary description of the data. For instance, in a proposed embodiment, the record description may comprise Record Descriptor Words (RDWs) that define a record layout within a data file. Similarly, the record description may include metadata present in a file header. Such metadata may include information relating to the properties of a data block (such as size, length, content, etc.), whether a record spans multiple data block, properties of a record, and the like.

By way of example, the data may include a data file, and the data file may include the associated record description. Embodiments may therefore be used in conjunction with data files that already include an associated record description within the file (e.g. within a header of the file). This may enable embodiments to use existing or conventional data files, thereby alleviating a need for special or proprietary data structures or files.

In some embodiments, the record description may include a record descriptor associated with each data record, each record descriptor include information relating to parameters or attributes of the associated data record. Nested records may therefore be employed in embodiments, wherein each record includes an associated descriptor. In this way, embodiments cater for the use of data stored in a nested record structure, such as Variable Blocked Spanned Record dataset that contains SMF records collected in a mainframe.

The indication of expected workload may include at least one of: a numerical value; a description of relative processing complexity; or a description of required processing resources. One or more embodiments may therefore use relatively simple descriptions or measures of expected workload, thereby reducing processing complexity and/or processing requirements.

One or more embodiments may further include receiving thread availability information representative of a number of available processing threads. Further, at least one of dividing the data into the plurality of data sets and allocating each of the data sets may be based on the received thread availability information. This may help to ensure that the appropriate data division or segmentation is determined while accounting for available processing resources. For instance, the data may be divided in a manner which defines the same number of data subsets as number of available processing threads. In this way, embodiments may ensure that all available processing threads will be utilized in executing a requested processing task. Wastage, such as non-use of an available processing thread, may therefore be avoided.

The determining an indication of expected workload for the data records may include: analyzing historical information relating to a previously executed data processing task using at least one of: the data, one or more data records of the data; or the multi-threaded processing arrangement. Determination of the expected workload may therefore be based on past and actual statistics and performance, thus improving accuracy of the determination.

One or more embodiments may further include executing the data processing task by parallel-processing each of the data sets in the respective allocated processing thread of the multi-threaded processing arrangement. Thus, in addition to undertaking a form of data pre-processing ahead of task execution, one or more embodiments may also include execution of the task. In this way, one or more proposed embodiments may enable both pre-processing of data ahead of a data processing task and execution of the data processing task after the pre-processing has been completed. Thus, a method of executing a data processing task in a multi-threaded processing environment may be provided.

An embodiment may further include: collecting execution statistics relating to the execution of the data processing task; and storing the execution statistics as historical information for use in determining an indication of expected workload. The execution statistics may then be stored as historical data for use in determining an indication of expected workload associated with executing part or all of a processing task. Determination of the expected workload may therefore be based on past and actual statistics and performance, thus improving accuracy of the determination.

According to another embodiment of the present invention, a computer program product is provided for data processing in a multi-threaded processing arrangement. The computer program product includes a computer readable storage medium having program instructions embodied therewith, the program instructions being executable by a processing unit to cause the processing unit to perform a method according to one or more of the above-summarized methods.

According to yet another aspect, there is provided a data processing system including at least one processor and the computer program product according to one or more embodiments, where the at least one processor is adapted to execute the computer program code of the computer program product.

According to yet another aspect, there is provided a system for data processing in a multi-threaded processing arrangement. The system includes a memory and a processor arrangement, communicatively coupled to the memory, wherein the system performs a method including: receiving a data processing task to be executed on data including a plurality of data records, the data having an associated record description including information relating to parameters or attributes of the plurality of data records; based on the received data processing task, analyzing the record description to determine an indication of expected workload for the data records; dividing the data into a plurality of data sets based on the determined indication of expected workload for the data records; and allocate the data sets to processing threads for parallel processing by a multi-threaded processing arrangement.

The system may be adapted to act as a data pre-processor or processing allocation/management unit between a processing task instructor and a multi-threaded processing resource.

Thus, a system may be provided which pre-processes data to be used in a processing task so as to determine expected processing workloads associated with various portions of the data. Based on the expected processing workloads, the data may then be split into various portions and the portions allocated to different processing threads for parallel processing. Taking such an approach may enable improved allocation or distribution of workload across available processing resources. For instance, it may avoid sub-optimal use of a processing thread by ensuring each data portions are allocated across processing threads so that each thread is utilized at optimal or maximum capacity.

BRIEF DESCRIPTION OF THE DRAWINGS

Embodiments of the present invention are described below, by way of example only, with reference to the drawings, in which.

DETAILED DESCRIPTION

Figure 1:
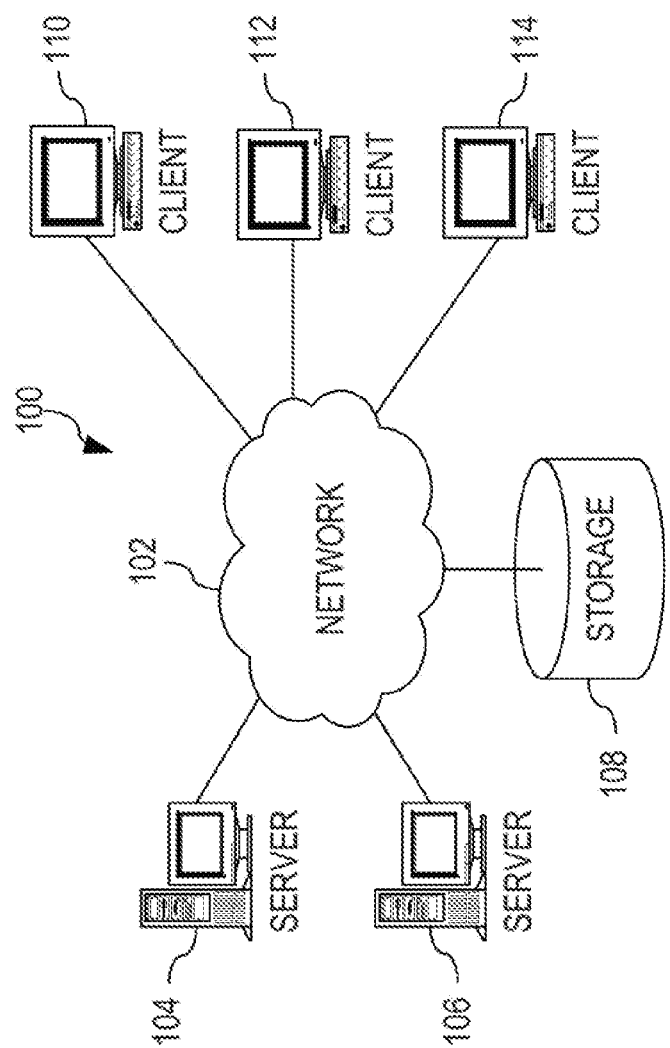
FIG. 1 depicts one embodiment of a distributed system in which one or more aspects of the present invention may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Provided herein, in one or more aspects, is pre-processing (e.g. analyzing and/or allocating) data ahead of a processing task so as to enable processing workload associated with processing the data to be distributed across available processing resources in an appropriate manner. By analyzing data to assess how properties of the data may impact execution of the processing task, the data may be distributed or allocated to different processing threads which helps to reduce processing time and/or use available processing resources optimally.

Embodiments may therefore allocate data for processing so as to avoid thread redundancy and/or help to improve processing efficiency.

For instance, proposed embodiments may enable identification that a portion of data (e.g. a record) requires more processing resource than other portions, and thus allocate the identified portion of data to one or more particular processing threads. In such circumstances, embodiments may be adapted to segment or divide the data into appropriately sized portions, so that the processing workload associated with processing each portion in accordance with a planned task is substantially equal for example.

Illustrative embodiments may therefore provide concepts for analyzing data properties ahead of executing a task using the data so as to determine the most appropriate way to allocate or distribute the data across multiple processing threads (for parallel processing for example). Dynamic, anticipatory and/or pre-emptive workload optimization may therefore be provided by proposed embodiments.

Modifications and additional steps to a traditional data processing system may also be provided which may enhance the value and utility of the proposed concepts.

Figure 2:
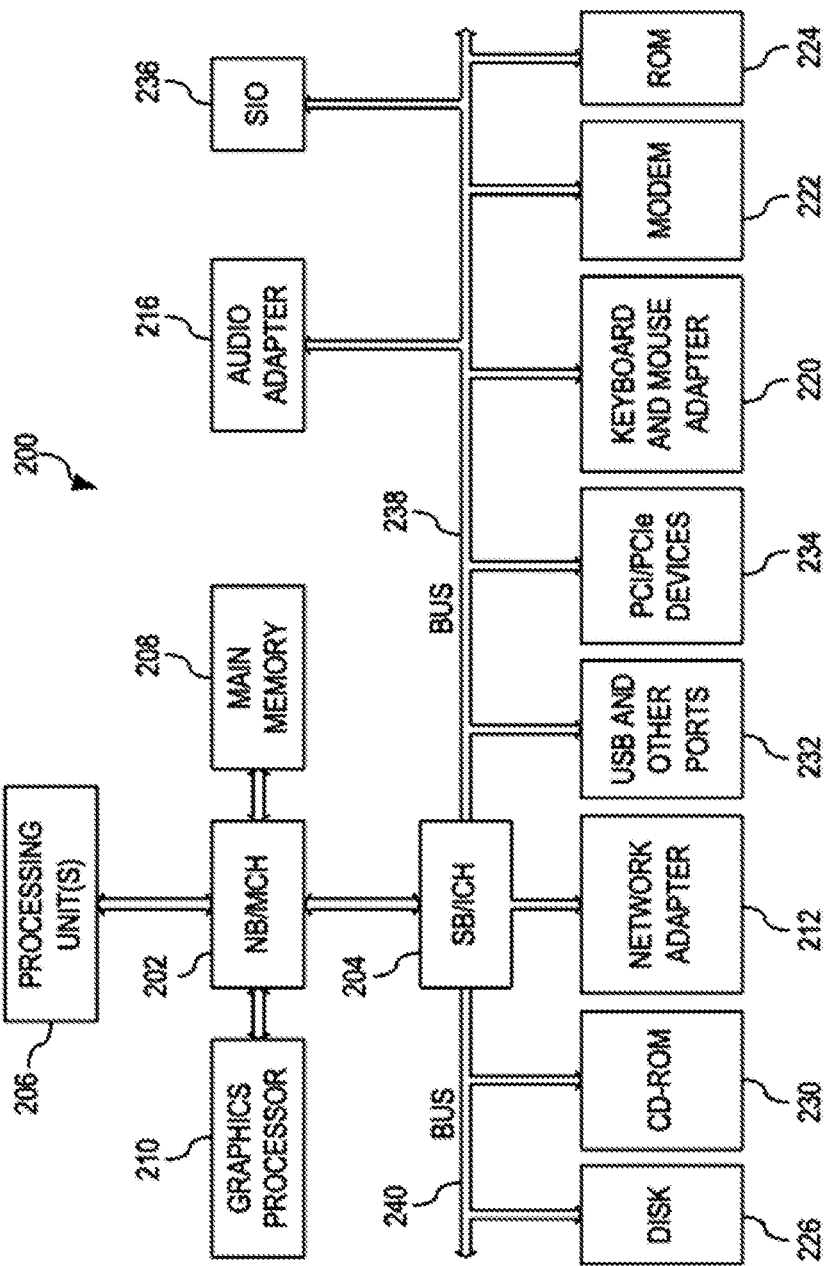
FIG. 2 is a block diagram of an example data processing system in which one or more aspects of the present invention may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 may be the Internet, with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may include one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is conFIG.d with flash memory to provide non-volatile memory for storing operating system files and/or user-generated data, for example. Thus, the system 200 may essentially be any known or later-developed data processing system without architectural limitation.

In one or more implementations a data processing system may be enhanced by the processing disclosed herein to improve or optimize processing workload across multiple processing threads. Embodiments may enable portions of data to be allocated or distributed across processing threads in an optimal manner for a particular processing task. Such proposals may help to improve the processing capabilities or efficiency of a multi-threaded processing system/environment.

Figure 3:
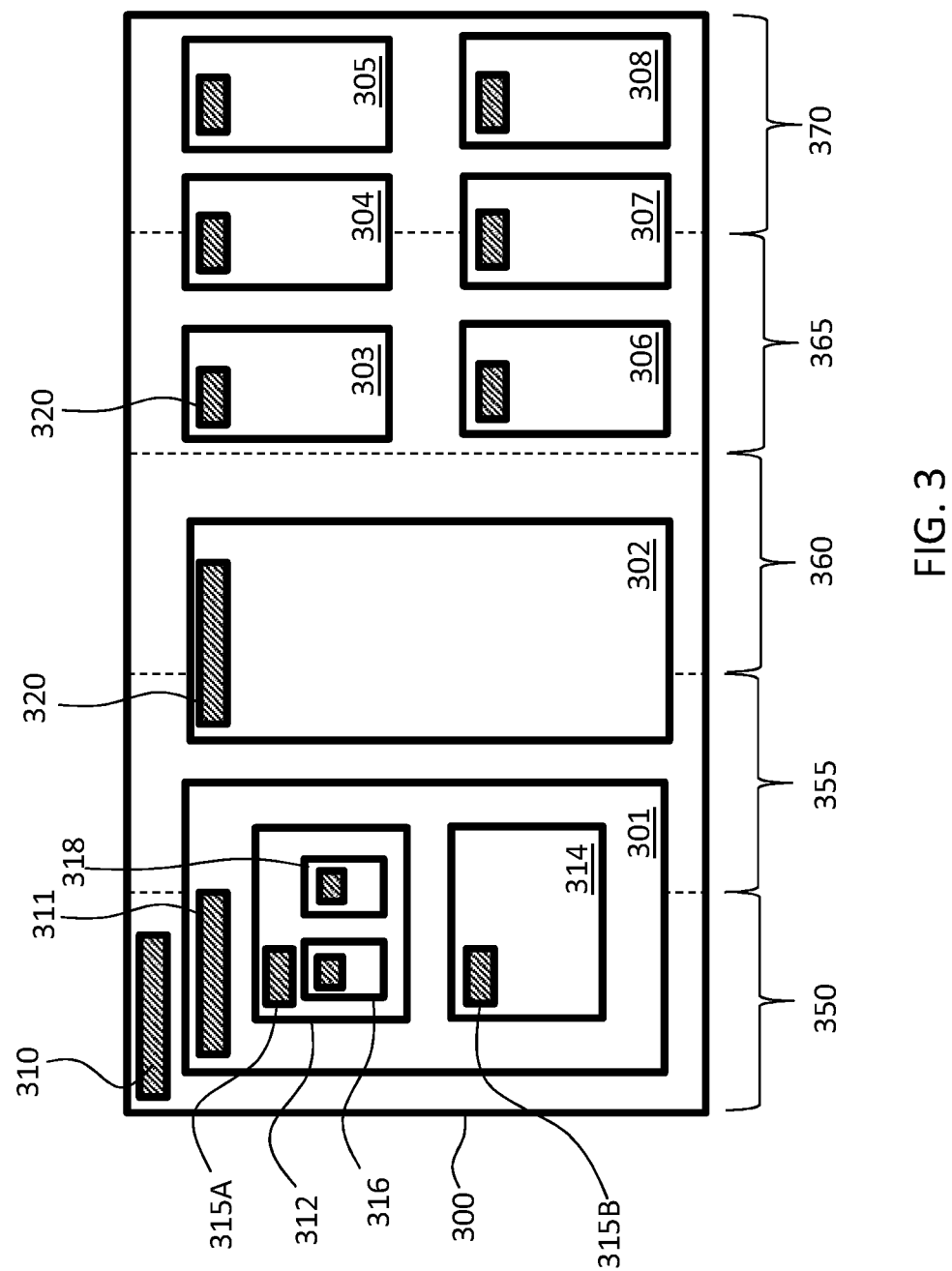
FIG. 3 illustrates an exemplary implementation of an embodiment with respect to a data file, in accordance with one or more aspects of the present invention.

Referring to FIG. 3, an exemplary implementation of an embodiment is described before where the existence of a processing task that is assumed to be performed on a data file 300. Here, the data file 300 is illustrated in a simplified and theoretical manner, and may include, for instance, 5 GB of data.

More particularly, in the example of FIG. 3, the data file 300 may include a file containing 5 GB of data stored in a nested records structure. An example of such data may be a Variable Blocked Spanned Record dataset that contains SMF records collected from a mainframe. Here, the data file 300 may contain first 301 to eighth 308 SMF records.

At the file level, the file may include a header or descriptor 310 (e.g. embedded in the data file 300) including Record Descriptor Words (RDWs) that define the record layout within the file 300. By way of example, the RDWs define a record layout within a data file, which may include information relating to the properties of data block (such as size, length, content, etc.), whether a record spans multiple data block, properties of a record, and the like.

Inside a record, there may be provided one or more SMF records, which in turn may have a similar layout to the parent data file 300. For example, a record within a record may include a header or descriptor that describes the record and may further comprise one or more records.

By way of example only, in the illustrated of embodiment of FIG. 3, the first SMF record 301 includes a descriptor (or record description) 311 and first 312 and second 314 sub-records. Each of the first 312 and second 314 sub-records may include a respective descriptor (or record description) 315A, 315B. Further, the first sub-records 312 may include first 316 and second 318 child records (e.g. sub-sub-records of the first SMF record 301). It is also noted that the second 302 to eighth 308 each comprise a respective descriptor (or record description 320) including information about the record.

If one now considers that the processing task may be one that must process certain types of SMF records within the data file 300 (e.g. all records of CICS Record Type 110, Subtype 1), a simple and conventional approach to undertaking the processing task on the data file 300 may be to implement a single task which starts as the beginning of the file and processed each record and then all the SMF records within, in turn. To improve this, one may create five processing threads or tasks that run in parallel, each one working on a separate portion of the data file 300. However, if, for example, there is no CICS data in a particular portion of the file (e.g. portion N), then the thread processing that portion (e.g. Thread N) may finish significantly quicker than the other threads. Clearly, this approach does not make efficient or optimal use of the processing threads since it may render one of the threads redundant after a short amount of time (and while the other threads may be continuing to undertake their respective processing).

Instead, disclosed herein are processes to distribute the data processing workload more efficiently across a plurality of processing threads. In particular, an embodiment may consider the data processing task and perform pre-processing using the record descriptions of the data file 300 to summarize a distribution of processing workload associated with the data file 300, thereby enabling data processing tasks to be assigned to different processing threads appropriately.

For instance, an embodiment may consider the data processing task in hand, and then analyze the record descriptions to determine an indication of expected workload for the data records of the data file 300. The data file 300 may then be divided into portions (e.g. a plurality of data sets) based on the determined indication of expected workload for the data records. Each of the portions of the data file may then be allocated, based on the determined indication of expected workload for the data records, to processing threads for parallel processing by a multi-threaded processing arrangement.

Taking the example data file 300 illustrated in FIG. 3 for example, an embodiment may analyze the record descriptions 310, 311, 315A, 315B, 320 and determine that a first GB 350 of the data file has 70% of all of the CICS records in the data file 300. Such analysis may also determine that the second GB 355, third GB 360 and fourth GB 365 of the data file each have 10% of the CICS records in the data file 300, and that the final, fifth GB 370 of the data file 300 has 20% of the CIC records in the data file 300.

Based on the determined percentages of CICS records in the first 350 to fifth 370 GBs of the data file, an associated expected workload for each GB may then be determined (e.g. implied or calculated directly from the determined percentages). In view of the expected workload, the data file 300 may then be divided into the first 350 to fifth 370 GBs and allocated to respective processing threads, and this may be done in view of available processing resource (e.g. available processing core, engines or threads). For example, in an example where the processing platform has 4 CPU cores available, a maximum of four processing threads may be chosen, one for each CPU core. The first GB 350 may then be allocated for processing by two threads (e.g. the $1^{st}$ and $2^{nd}$ threads). The second 355, third 360 and fourth 365 GBs may be allocated to a single thread (e.g. the $3^{rd}$ thread). Then fifth and final GB 370 may be allocated to its own thread (e.g. the $4^{th}$ thread). In this way, each GB of the data file 300 may be allocating to processing threads for parallel processing by a multi-threaded processing arrangement, and this may be done based on a determined indication of expected workload for each GB of the data file 300.

Figure 4:
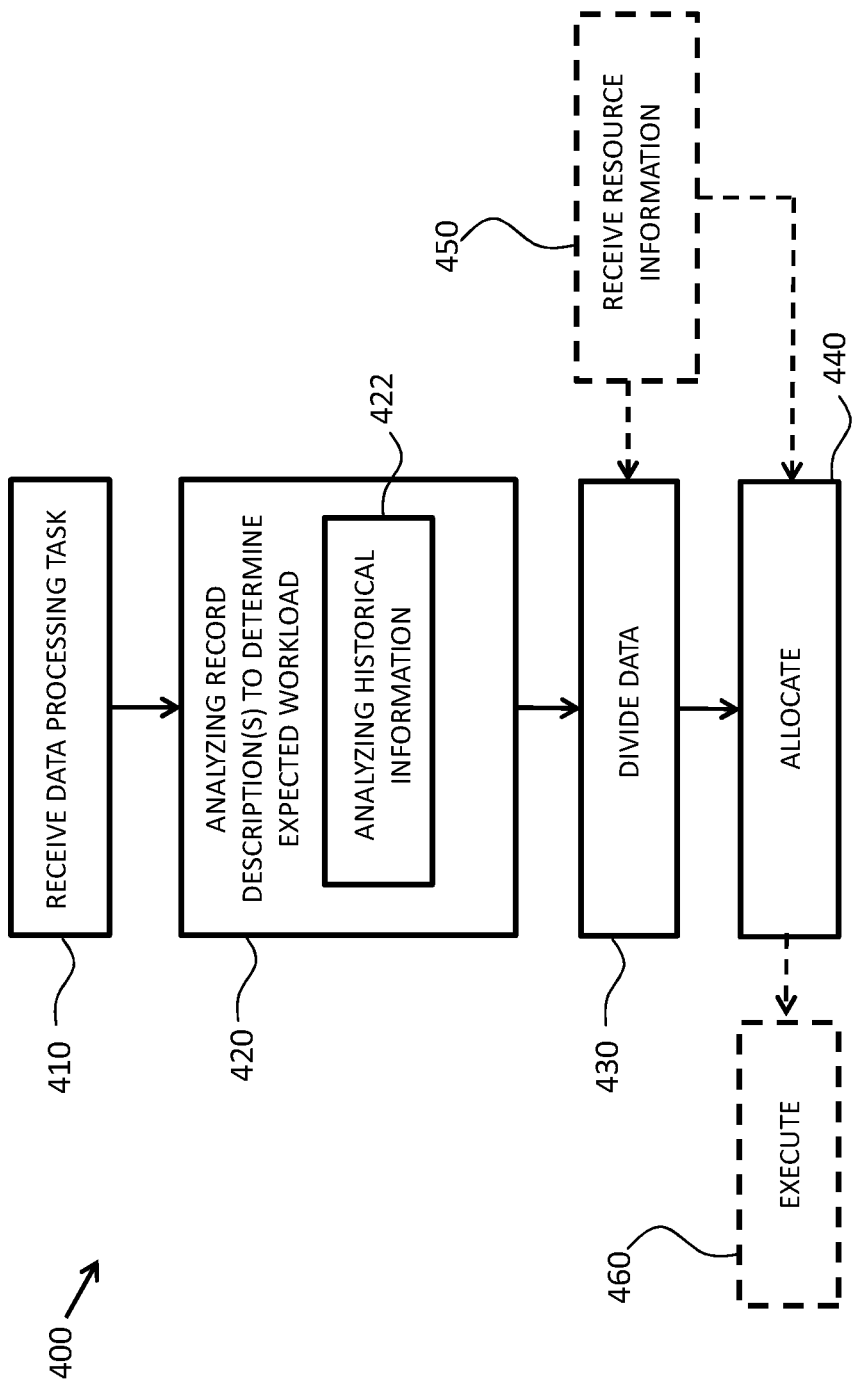
FIG. 4 is a flow diagram of a computer-implemented method, in accordance with one or more aspects of the present invention.

Turning to FIG. 4, there is depicted a flow diagram of a computer-implemented method 400 according to an embodiment. Here, the method may be for pre-processing data for use in a multi-threaded processing environment. In this example, the data includes a data file, and the data file may include (e.g. contain within the data of the file) a record description including information relating to parameters or attributes of the plurality of data records in the data file. The exemplary method may therefore be used on an existing or conventional data file, thereby alleviating a need for special or proprietary data structures or files. It will be appreciated, however, that in some embodiments, the record description may be provided separately from the data of the data file (e.g. not embedded/included within the data or file). For instance, the record description may be provided as a separate file, document or piece of information that is associated with a particular set of data or file.

Further, in this example, the record description may include metadata. In particular, the metadata may include information relating to the properties of a data block (such as size, length, content, etc.), whether a record spans multiple data block, properties of a record, and the like. In some embodiments, the record description may include a record descriptor associated with each data record, each record descriptor comprising information relating to parameters or attributes of the associated data record. Nested records may therefore be employed, wherein each record comprises an associated descriptor. In this way, proposed methods may cater for the use of data stored in a nested record structure.

The method begins at step 410 wherein a data processing task to be executed on the data may be received. In step 420, the record description may be analyzed based on the received data processing task so as to determine an indication of expected workload for the data records of the data file.

In this example, step 420 of determining an indication of expected workload for the data records may include the step 422 of analyzing historical information relating to a previously executed data processing task that made use of at least one of: the data, one or more data records of the data; or the multi-threaded processing arrangement. In this way, the determination of the expected workload may be based on past and actual statistics and performance.

In step 430, the data may be divided into a plurality of data sets. For example, the data may be divided into data sets of equal size (e.g. irrespective of the size of the records) or divided into data sets having an equal number of records (e.g. irrespective of the size of the records.

In step 440, based on the determined indication of expected workload for the data records, the data sets may be allocated to processing threads for parallel processing by a multi-threaded processing arrangement. Allocating the data sets made be undertaken in accordance with a work allocation algorithm that may have an associated configuration which enables it to decide or filter which records from a data set are relevant when deciding on how to distribute work.

By way of further example, some embodiments may include the additional step 450 of receiving resource information (as depicted by the dashed box labelled "450" and its accompanying arrows). For instance, thread availability information representative of a number of available processing threads may be received. Using such received information, at least one of: (Step 430) dividing the data into a plurality of data sets and (Step 440) allocating each of the data sets, may be based on the received thread availability information. This may help to ensure that the appropriate data division or segmentation is determined while accounting for available processing resources (such as the number of available processing threads for example). By way of example, the data may be divided in a manner which defines the same number of data sets as number of available processing threads. In this way, embodiments may ensure that all available processing threads will be utilized in executing a requested processing task.

Also, by way of further example, embodiments may also include the additional step 460 of executing the data processing task by parallel-processing the data sets in its allocated processing thread of the multi-threaded processing arrangement (as depicted by the dashed box labelled "460"). Thus, in addition to undertaking a form of data pre-processing ahead of task execution, embodiments may include execution of the task.

It is also noted that one or more embodiments may further include: collecting execution statistics relating to the execution of the data processing task; and storing the execution statistics as historical information for use in determining an indication of expected workload. The execution statistics may then be stored as historical data for use in the step 420 of determining an indication of expected workload associated with executing part or all of a processing task. Determination of the expected workload may therefore be based on past and actual statistics and performance, thus improving accuracy of the determination.

Figure 5:
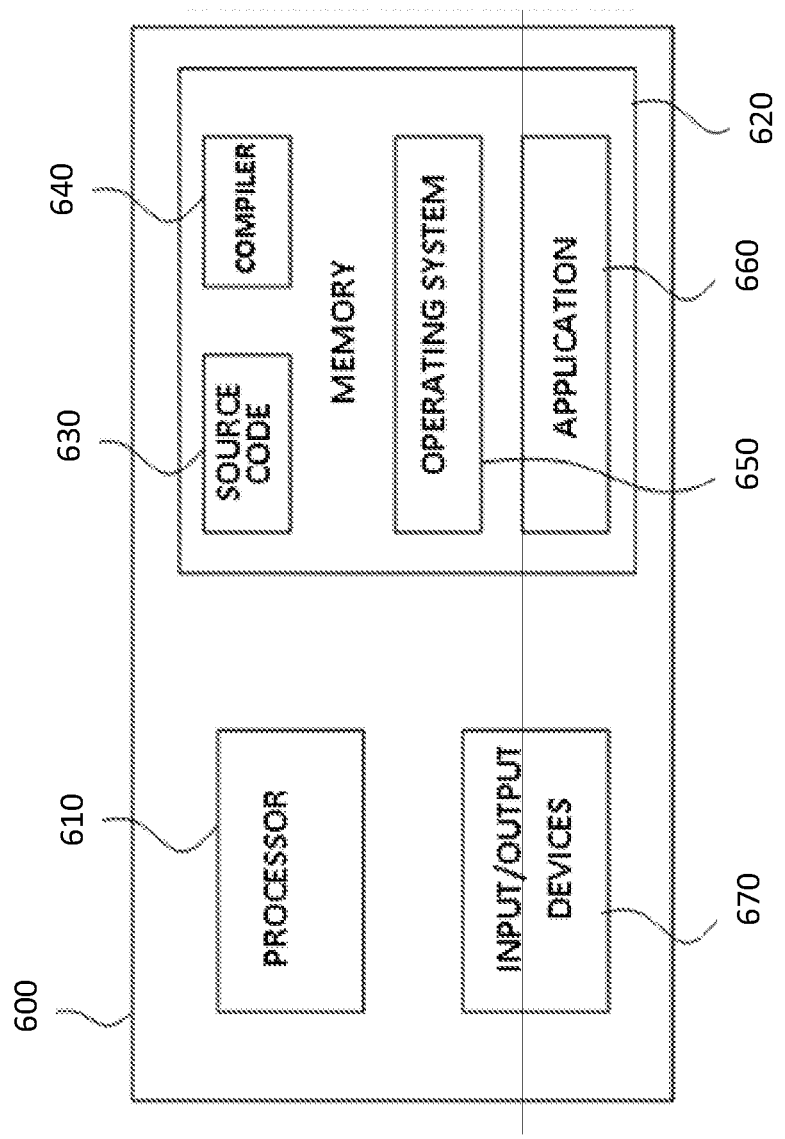
FIG. 5 is a simplified block diagram of a computer within which one or more parts of an embodiment may be employed, in accordance with one or more aspects of the present invention.

FIG. 5 illustrates an example of a computer 600 within which one or more aspects of an embodiment may be employed. Various operations discussed above may utilize the capabilities of the computer 600. For example, one or more aspects of a system for data processing in a multi-threaded processing arrangement may be incorporated in any element, module, application, and/or component discussed herein.

The computer 600 may include, but is not limited to, PCs, workstations, laptops, PDAs, palm devices, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a microprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

Where the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is conFIG.d to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method.

The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGURES. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data processing in a multi-threaded processing arrangement, the method comprising:
receiving a data processing task to be executed on a data file comprising a plurality of data records in a nested records structure, where one or more data records are within one or more other data records, the data file and the plurality of data records each having an associated record description that defines a data layout, including information relating to parameters or attributes of the plurality of data records;
based on the received data processing task, pre-processing the data file to analyze the record descriptions associated with the data file and the plurality of data records, and determine therefrom characteristics of the data records;
dividing the data file into a plurality of data sets based on the analyzing of the record descriptions associated with the data file, and a comparing of the determined characteristics of the data records, wherein one or more data records of the plurality of data records are divided between different data sets of the plurality of data sets;
based on the determined plurality of data sets, allocating the data sets of the divided data file to processing threads for parallel processing by the multi-threaded processing arrangement; and
wherein different processing threads of the multi-threaded processing arrangement have different processing capabilities, and the allocating is based, in part, on a comparison of the determined characteristics of the data records to the different processing capabilities of the different threads of the multi-threaded processing arrangement.

2. The method of claim 1, wherein the record description comprises metadata.

3. The method of claim 1, wherein the record descriptions comprise a record descriptor associated with each data record, each record descriptor comprising information relating to parameters or attributes of the associated data record.

4. The method of claim 1, wherein the characteristics of the data records comprise at least one of:
a description of relative processing complexity; or
a description of required processing resources.

5. The method of claim 1, further comprising:
receiving thread availability information representative of a number of available processing threads; and
wherein at least one of the dividing the data file into a plurality of data sets and the allocating the data sets, is based on the received thread availability information.

6. The method of claim 1, further comprising:
executing the data processing task by parallel-processing the data sets in its allocated processing thread of the multi-threaded processing arrangement.

7. A computer program product for data processing in a multi-threaded processing arrangement, the computer program product comprising:
a computer readable storage medium having program instructions embodied therewith, the program instructions being executable by a processing unit to cause the processing unit to perform a method comprising:
receiving a data processing task to be executed on a data file comprising a plurality of data records in a nested records structure, where one or more data records are within one or more other data records, the data file and the plurality of data records each having an associated record description that defines a data layout, including information relating to parameters or attributes of the plurality of data records;
based on the received data processing task, pre-processing the data file to analyze the record descriptions associated with the data file and the plurality of data records, and determine therefrom characteristics of the data records;
dividing the data file into a plurality of data sets based on the analyzing of the record descriptions associated with the data file, and a comparing of the determined characteristics of the data records, wherein one or more data records of the plurality of data records are divided between different data sets of the plurality of data sets;
based on the determined plurality of data sets, allocating the data sets of the divided data file to processing threads for parallel processing by the multi-threaded processing arrangement; and
wherein different processing threads of the multi-threaded processing arrangement have different processing capabilities, and the allocating is based, in part, on a comparison of the determined characteristics of the data records to the different processing capabilities of the different threads of the multi-threaded processing arrangement.

8. The computer program product of claim 7, wherein the record description comprises metadata.

9. The computer program product of claim 7, wherein the record descriptions comprise a record descriptor associated with each data record, each record descriptor comprising information relating to parameters or attributes of the associated data record.

10. The computer program product of claim 7, wherein the characteristics of the data records comprise at least one of:
a description of relative processing complexity; or
a description of required processing resources.

11. The computer program product of claim 7, further comprising:
receiving thread availability information representative of a number of available processing threads; and
wherein at least one of the dividing the data file into a plurality of data sets and the allocating the data sets, is based on the received thread availability information.

12. The computer program product of claim 7, further comprising:
executing the data processing task by parallel-processing the data sets in its allocated processing thread of the multi-threaded processing arrangement.

13. A system for data processing in a multi-threaded processing arrangement, the system comprising:
a memory: and
a processor arrangement communicatively coupled to the memory, wherein the system performs a method comprising:
receiving a data processing task to be executed on a data file comprising a plurality of data records in a nested records structure, where one or more data records are within one or more other data records, the data file and the plurality of data records each having an associated record description that defines a data layout, including information relating to parameters or attributes of the plurality of data records;

based on the received data processing task, pre-processing the data file to analyze the record descriptions associated with the data file and the plurality of data records, and determine therefrom characteristics of the data records;

dividing the data file into a plurality of data sets based on the analyzing of the record descriptions associated with the data file, and a comparing of the determined characteristics of the data records, wherein one or more data records of the plurality of data records are divided between different data sets of the plurality of data sets;

based on the determined plurality of data sets, allocating the data sets of the divided data file to processing threads for parallel processing by the multi-threaded processing arrangement; and wherein different processing threads of the multi-threaded processing arrangement have different processing capabilities, and the allocating is based, in part, on a comparison of the determined characteristics of the data records to the different processing capabilities of the different threads of the multi-threaded processing arrangement.

14. The system of claim 13, wherein the record description comprises metadata.

15. The system of claim 13, wherein the record descriptions comprise a record descriptor associated with each data record, each record descriptor comprising information relating to parameters or attributes of the associated data record.

16. The system of claim 13, wherein the characteristics of the data records comprise at least one of:
a description of relative processing complexity; or
a description of required processing resources.

17. The system of claim 13, wherein the system is further adapted to:
receive thread availability information representative of a number of available processing threads; and
divide the data file into the plurality of data sets or allocate the data sets based on the receive thread availability information.

18. The system of claim 13, further comprising:
executing the data processing task by parallel-processing the data sets in its allocated processing thread of the multi-threaded processing arrangement.

* * * * *